US012529657B2

(12) United States Patent
Alperowitz et al.

(10) Patent No.: US 12,529,657 B2
(45) Date of Patent: Jan. 20, 2026

(54) METHOD OF PERFORMING AN ANALYTICAL MEASUREMENT USING A MOBILE DEVICE

(71) Applicant: Roche Diabetes Care, Inc., Indianapolis, IN (US)

(72) Inventors: Lukas Alperowitz, Munich (DE); Max Berg, Mannheim (DE); Fredrik Hailer, Rhineland-Palatinate (DE); Bernd Limburg, Soergenloch (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 582 days.

(21) Appl. No.: 18/150,551

(22) Filed: Jan. 5, 2023

(65) Prior Publication Data

US 2023/0152239 A1 May 18, 2023

Related U.S. Application Data

(63) Continuation of application No. PCT/EP2021/068431, filed on Jul. 5, 2021.

(30) Foreign Application Priority Data

Jul. 6, 2020 (EP) ..................................... 20184181

(51) Int. Cl.
*G01N 21/84* (2006.01)
*G01N 21/77* (2006.01)
*G01N 21/78* (2006.01)

(52) U.S. Cl.
CPC ......... *G01N 21/8483* (2013.01); *G01N 21/78* (2013.01); *G01N 2021/7759* (2013.01);
(Continued)

(58) Field of Classification Search
CPC ............... G01N 21/8483; G01N 21/78; G01N 2021/7759; G01N 2021/8488;
(Continued)

(56) References Cited

U.S. PATENT DOCUMENTS 9,485,416 B2 11/2016 Budihal
9,903,857 B2 2/2018 Polwart et al.
(Continued)

FOREIGN PATENT DOCUMENTS

CN 108562548 A 9/2018
CN 110462385 A 11/2019
(Continued)

OTHER PUBLICATIONS

International Search Report and Written Opinion of the International Searching Authority, PCT/EP2021/068431, Oct. 19, 2021, 10 pages.
(Continued)

*Primary Examiner* — Dennis White
(74) *Attorney, Agent, or Firm* — Bose McKinney & Evans LLC

(57) ABSTRACT

A method of performing an analytical measurement includes using a camera of a mobile device to capture a time series of images of at least a part of a medical article. From this, image-derived position information on a relative position of the mobile device and the medical article is derived, thereby generating a first time series of position information. A sensor captures measurement information on the relative position of the mobile device and the medical article. Measurement-derived position information is used to generate a second time series of position information, and the first and second time series of position information are combined to generate an augmented time series of position information. From this, guidance is provided to a user to
(Continued)

move the mobile device and the medical article into a relative target position. A mobile device, a kit and a computer program are also disclosed.

14 Claims, 3 Drawing Sheets

(52) U.S. Cl.
CPC ............... *G01N 2021/8488* (2013.01); *G01N 2201/0221* (2013.01)

(58) Field of Classification Search
CPC .. G01N 2201/0221; G06T 2207/10016; G06T 2207/10024; G06T 7/0012; G06T 7/73
See application file for complete search history.

(56) References Cited

U.S. PATENT DOCUMENTS

| | | |
|---|---|---|
| 9,906,712 B2 | 2/2018 | Garcia Morate et al. |
| 10,353,049 B2 | 7/2019 | Wonneberger et al. |
| 10,357,092 B2 | 7/2019 | Kustra et al. |
| 2010/0321291 A1 | 12/2010 | Kabasawa et al. |
| 2014/0154789 A1* | 6/2014 | Polwart .............. G01N 21/8483 422/403 |
| 2019/0178624 A1 | 6/2019 | DeWald et al. |
| 2020/0080942 A1 | 3/2020 | Chen et al. |
| 2020/0191722 A1 | 6/2020 | Lu et al. |

FOREIGN PATENT DOCUMENTS

| | | |
|---|---|---|
| EP | 1 963 828 B1 | 3/2010 |
| JP | 2020-514752 A | 5/2020 |
| TW | 201924605 A | 7/2019 |
| WO | WO 2012/131386 A1 | 10/2012 |
| WO | WO 2019/238500 A1 | 12/2019 |

OTHER PUBLICATIONS

Hones et al., The Technology Behind Glucose Meters: Test Strips, Diabetes Technology & Therapeutics, vol. 10, Supplement 1, 2008, pp. S-10-S-26.

* cited by examiner

METHOD OF PERFORMING AN ANALYTICAL MEASUREMENT USING A MOBILE DEVICE

RELATED APPLICATIONS

This application is a continuation of PCT/EP2021/068431, filed Jul. 5, 2021, which claims priority to EP 20 184 181.4, filed Jul. 6, 2020, both of which are hereby incorporated herein by reference.

BACKGROUND

This disclosure refers to a method of performing at least one analytical measurement by using a mobile device. This disclosure further refers to a mobile device, to a kit for performing the at least one analytical measurement and to a computer program and a computer-readable storage medium. The method and devices specifically may be used in medical diagnostics, in order to, for example, quantitatively and/or qualitatively detect one or more analytes in a sample of a body fluid, such as for detecting glucose in blood and/or in interstitial fluid. Other fields of application of this disclosure, however, are also feasible.

In the field of medical diagnostics, in many cases, one or more analytes have to be detected in samples of a body fluid, such as blood, interstitial fluid, urine, saliva or other types of body fluids. Examples of analytes to be detected are glucose, triglycerides, lactate, cholesterol or other types of analytes typically present in these body fluids. According to the concentration and/or the presence of the analyte, an appropriate treatment may be chosen, if necessary. Without narrowing the scope, this disclosure specifically may be described with respect to blood glucose measurements. It shall be noted, however, that this disclosure may also be used for other types of analytical measurements, specifically analytical measurements using one or more test elements.

Generally, devices and methods known to the skilled person make use of test elements comprising one or more test chemicals, which, in presence of the analyte to be detected, are capable of performing one or more detectable detection reactions, such as optically detectable detection reactions. With regard to the test chemicals comprised in test elements, reference may be made, e.g., to J. Hoenes et al.: The Technology Behind Glucose Meters: Test Strips, Diabetes Technology & Therapeutics, Volume 10, Supplement 1, 2008, S-10 to S-26. Other types of test chemistry are possible and may be used for performing this disclosure.

In analytical measurements, specifically analytical measurements based on color formation reactions, one technical challenge resides in the evaluation of the color change which is due to the detection reaction. Besides using dedicated analytical devices, such as handheld blood glucose meters, the use of generally available electronics such as smart phones and portable computers or other mobile devices has become more and more popular over the recent years. As an example, WO 2012/131386 A1 discloses a testing apparatus for per-forming an assay, the testing apparatus comprising: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

Another method of performing at least one analytical measurement by using a mobile device having at least one camera is disclosed in EP 1 963 828 B1. WO 2019/238500 A1 discloses a calibration method for calibrating a camera of a mobile device.

As opposed to laboratory measurements and measurements performed by using dedicated analytical measurement devices, when using mobile computing devices such as smart phones, various influences need to be taken into account. Specifically, a camera-based evaluation of optical test strips by using mobile devices may require capturing images having defined intensity criteria. For example, captured images may be devoid of glare and/or specular reflection, specifically on relevant elements in the images, such as the test field, the reference fields and/or other elements.

In order to enable the mobile computing device to capture images obeying the defined intensity criteria, the mobile device and the object to be imaged may be aligned in a predetermined position to each other. For example, the spatial and/or the angular orientation may be derived from elements of the captured image having known geometry.

Generally, in several fields of technology, methods for deriving spatial information from digital images are known. For example, U.S. Pat. No. 10,357,092 B2 describes a shaving guidance system for guiding a user during a shaving procedure, the system comprising an image sensor configured to register an image of a part of the body of the user, an image data analyzer configured to determine a local hair-growth direction based on data in the image, a controller configured to generate instructions about a direction in which a hair cutting device is to be moved in dependence on the determined local hair-growth direction, and a feedback system configured to provide the instructions to the user.

U.S. Pat. No. 9,906,712 B2 discloses methods and apparatus to capture photographs using mobile devices. An example method includes receiving sensor data from a sensor in a mobile device. The example method further includes presenting visual feedback to a user, via a display of the mobile device, to guide the user in capturing a photograph with a camera of the mobile device. The visual feedback is based on the sensor data.

U.S. Pat. No. 9,485,416 B2 discloses a method for guiding a user to capture an image of a target object using an image capturing device. In an embodiment, the method comprises determining a bounding area for image to be captured and capturing at least one frame of the image upon detecting image to be inside the bounding area. Then, the target object in the captured at least one frame is segmented by separating the target object from the rest of the image. Further, at least one of symmetry and self-similarity of the segmented target object is determined. In addition, at least one image parameter is determined by a sensor. The method then provides inputs for guiding user to capture a final image of the target object, based on at least one of determined symmetry, self-similarity, and at least one image parameter.

U.S. Pat. No. 10,353,049 B2 describes a detector device for determining an orientation of at least one object. The detector device comprises: at least two beacon devices, the beacon devices being adapted to be at least one of attached to the object, held by the object and integrated into the object, the beacon devices each being adapted to direct light beams towards a detector, the beacon devices having predetermined coordinates in a coordinate system of the object; at least one detector adapted to detect the light beams traveling from the beacon devices towards the detector; at least one evaluation device, the evaluation device being adapted to determine longitudinal coordinates of each of the beacon devices in a coordinate system of the detector, the evaluation device being further adapted to determine an orientation of the object in the coordinate system of the detector by using the longitudinal coordinates of the beacon devices.

Referring to the technical field of chemical testing, U.S. Pat. No. 9,903,857 B2 describes a testing apparatus for performing an assay, the testing apparatus comprising: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

Despite the advantages achieved by the known methods and devices, several technical challenges remain. Specifically, deriving spatial and/or angular orientation of the mobile device by image processing remains challenging. Specifically, processing multiple image frames per second, such as at least 10 image frames per second, may generally be possible when using mobile devices with high computing resources. The derived information may be used to guide the user to the correct image recording position. In order to enable sufficient user guidance, however, fast feedback is generally required. In case mobile devices having low computing resources shall be used, only a limited number of images, for example, only 1 or 2 image frames per second, may generally be processed by the mobile device. This frequency, however, may be too slow to enable a correct guidance for the user of the mobile device. It may be possible that the user will be trapped in a loop of searching the correct positioning.

SUMMARY

This disclosure teaches devices and a method of performing at least one analytical measurement which at least partially address the above-mentioned challenges. Specifically, devices and methods are disclosed which allow for a fast, efficient and convenient user-guidance for performing the analytical measurement by using a mobile device. More specifically, means and methods for performing the analytical measurement by using mobile devices having a low computing power are disclosed.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "camera," "medical article" and "sensor," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure, a method of performing at least one analytical measurement is disclosed. The method comprises using a mobile device having at least one camera. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises:
i) capturing, by using the camera, a time series of images of at least a part of at least one medical article;
ii) deriving, from the time series of images, image-derived position information on a relative position of the mobile device and the medical article, thereby generating a first time series of position information;
iii) capturing, by using at least one sensor device of the mobile device, measurement information on the relative position of the mobile device and the medical article;
iv) deriving, from the measurement information, measurement-derived position information on the relative position of the mobile device and the medical article, thereby generating a second time series of position information;
v) generating an augmented time series of position information by combining the first time series of position information and the second time series of position information; and
vi) providing guidance to a user, based on the augmented time series of position information, for changing the relative position of the mobile device and the medical article in order to have the user bring the mobile device into at least one relative target position of the mobile device and the medical article.

The term "performing an analytical measurement," also referred to as an "analytical measurement," as used herein is a broad term and is to be given its ordinary and customary meaning to a person of ordinary skill in the art and is not to be limited to a special or customized meaning. The term specifically may refer, without limitation, to a quantitative and/or qualitative determination of at least one medical parameter, specifically to a quantitative and/or qualitative determination of at least one analyte. Specifically, the analytical measurement may refer to a quantitative and/or qualitative determination of at least one analyte in an arbitrary sample or aliquot of body fluid. For example, the body fluid may comprise one or more of blood, interstitial fluid, urine, saliva or other types of body fluids. The result of the determination, as an example, may be a concentration of the analyte and/or the presence or absence of the analyte to be determined. Specifically, as an example, the analytical measurement may be a blood glucose measurement, thus the result of the analytical measurement may, for example, be a blood glucose concentration. In particular, an analytical measurement result value and/or an analyte concentration value may be determined by the analytical measurement, such as a blood glucose concentration value. The term "analyte concentration value," often also referred to as "analytical measurement result value," as used herein, is a broad term and is to be given its ordinary and customary meaning to a person of ordinary skill in the art and is not to be limited to a special or customized meaning. The term specifically may refer, without limitation, to a numerical indication of an analyte concentration in a sample. The at least one analyte, as an example, may be or may comprise one or more specific chemical compounds and/or other parameters. As an example, one or more analytes may be determined which take part in metabolism, such as blood glucose. Additionally or alternatively, other types of analytes or parameters may be determined, e.g., a pH value.

The method, as outlined above, comprises using a mobile device having at least one camera. The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, as will be outlined in further detail below, the mobile device may also refer to a tablet computer or another type of portable computer having at least one camera.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip.

The camera, besides the at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted, automatically or manually. This disclosure specifically shall be applicable to cameras as usually used in mobile applications such as notebook computers, tablets or, specifically, cell phones such as smart phones. Thus, specifically, the camera may be part of a mobile device which, besides the at least one camera, comprises one or more data processing devices such as one or more data processors. Other cameras, however, are feasible.

The camera specifically may be a color camera. Thus, such as for each pixel, color information may be provided or generated, such as color values for three colors R, G, B. A larger number of color values is also feasible, such as four color values for each pixel, for example, R, G, G, B. Color cameras are generally known to the skilled person. Thus, as an example, the camera chip may consist of a plurality of three or more different color sensors each, such as color recording pixels like one pixel for red (R), one pixel for green (G) and one pixel for blue (B). For each of the pixels, such as for R, G, B, values may be recorded by the pixels, such as digital values in the range of 0 to 255, depending on the intensity of the respective color. Instead of using color triples such as R, G, B, as an example, quadruples may be used, such as R, G, G, B. The color sensitivities of the pixels may be generated by color filters or by appropriate intrinsic sensitivities of the sensor elements used in the camera pixels. These techniques are generally known to the skilled person.

As outlined above, step i) comprises capturing, by using the camera, a time series of images. The term "time series of images" as used herein is a broad term and is to be given its ordinary and customary meaning to a person of ordinary skill in the art and is not to be limited to a special or customized meaning. The term specifically may refer, without limitation, to a sequence of images, wherein each image has a different capturing time. Specifically, the time series of images may comprise at least one first image and at least one second image, wherein the first image may be captured prior to the second image and, thus, the first image may have an earlier capturing time than the second image. Further, the time series may comprise a plurality of images, specifically more than two images, more specifically even more than five images, each having a different capturing time. For example, the capturing of the time series of images may comprise recording continuously a sequence of images such as a video or a movie or a plurality of single captured images. The different capturing times of the time series of images may be equidistant points in time or may be unequally distanced points in time. Further, capturing the time series of images may specifically comprise capturing at least one image by using the camera of the mobile device. The time series of images may be captured continuously, such that, in regular or irregular time intervals, new images may be captured and added to the time series. Older images of the time series may be maintained or discarded. The images of the time series may be stored in a data storage device, e.g., of the mobile device or externally.

The term "capturing at least one image" as used herein is a broad term and is to be given its ordinary and customary meaning to a person of ordinary skill in the art and is not to be limited to a special or customized meaning. The term specifically may refer, without limitation, to one or more of imaging, image recording, image acquisition, image capturing. The term "capturing at least one image" may comprise capturing a single image and/or a plurality of images. The capturing of the at least one image may be initiated by the user action or may automatically be initiated, e.g., once the presence of the at least one object within a field of view and/or within a predetermined sector of the field of view of the camera is automatically detected. These automatic image acquisition techniques are known, e.g., in the field of automatic barcode readers, such as from automatic barcode reading apps. The capturing of the images may take place, as an example, by acquiring a stream or "life stream" of images with the camera, wherein one or more of the images, automatically or by user interaction such as pushing a button, are stored and used as the at least one first image or the at least one second image, respectively. The image acquisition may be supported by a processor of the mobile device, and the storing of the images may take place in a data storage device of the mobile device.

As further outlined above, step i) comprises capturing the time series of images of at least a part of at least one medical article. The term "medical article" as used herein is a broad term and is to be given its ordinary and customary meaning to a person of ordinary skill in the art and is not to be limited to a special or customized meaning. The term specifically may refer, without limitation, to an arbitrary element or article being configured for use in the field of medical technology, specifically in the field of medical analytics or medical diagnostics. The medical article may be configured for performing at least one function in the field of medical technology, specifically medical diagnostics. Specifically, the medical article may comprise one or more elements, wherein the plurality of elements may interact with each other or wherein each element may have a specific function for enabling the functionality of the medical article. For example, the medical article may be or may comprise at least one test element, specifically a test strip, more specifically an optical test strip. The medical article may also comprise at least one color reference card, specifically for providing color reference and/or gray level or intensity reference for an analytical measurement using an optical test strip. The medical article may also comprise at least one optical test strip and at least one color reference card, wherein the optical test strip and the color reference card may be two distinct elements of the medical article or wherein the optical test strip may be comprised by the color reference card or alternatively, vice versa.

The term "optical test strip" as used herein is a broad term and is to be given its ordinary and customary meaning to a person of ordinary skill in the art and is not to be limited to a special or customized meaning. The term specifically may refer, without limitation, to an arbitrary element or device configured for performing a color change detection reaction, specifically in the presence of at least one specific analyte to be detected. The optical test strip may also be referred to as test strip or test element, wherein all three terms may refer to the same element. The optical test strip may particularly have a reagent test field, sometimes also simply referred to as a "test field," containing at least one test chemical for detecting at least one analyte. The optical test strip, as an example, may comprise at least one substrate, such as at least one carrier, with the at least one reagent test field applied thereto or integrated therein. In particular, the optical test strip may further comprise at least one white area, such as a white field, specifically in a proximity to the test field, for example, enclosing or surrounding the test field. The white area may be a separate field independently arranged on the substrate or carrier. However, additionally or alternatively, the substrate or carrier itself may be or may comprise the white area. As an example, the at least one carrier may be strip-shaped, there-by rendering the test element a test strip. These test strips are generally widely in use and available. One test strip may carry a single reagent test field or a plurality of reagent test fields having identical or different test chemicals comprised therein.

The term "reagent test field," also simply referred to as "test field," as used herein is a broad term and is to be given its ordinary and customary meaning to a person of ordinary skill in the art and is not to be limited to a special or customized meaning. The term specifically may refer, without limitation, to a coherent amount of the test chemical, such as to a field, e.g., a field of round, polygonal or rectangular shape, having one or more layers of material, with at least one layer of the reagent test field having the test chemical comprised therein.

The term "color reference card" as used herein is a broad term and is to be given its ordinary and customary meaning to a person of ordinary skill in the art and is not to be limited to a special or customized meaning. The term specifically may refer, without limitation, to an arbitrary item having, disposed therein or disposed thereon, such as on at least one surface, at least one color reference field having known color properties or optical properties, such as having one or more colored fields having known reference color values, and further at least one gray reference field having known gray levels. As an example, the color reference card may be a flat card comprising at least one substrate having, on at least one surface and/or disposed therein, at least one color reference field having known color coordinates and at least one gray reference field having known gray levels. The substrate, specifically, may have a flat surface with the color reference fields and the gray reference fields disposed thereon. The substrate, as an example, may be or may comprise one or more of a paper substrate, a cardboard substrate, a plastic substrate, a ceramic substrate or a metal substrate. Laminate substrates are also possible. The substrate, as an example, may be sheet-like or flexible. It shall be noted, however, that the substrate may also be implemented into an article of use, such as into a wall of a box, a vial, a container, a medical consumable, such as a test strip, or the like. Thus, the color reference card may also fully or partially be integrated into the optical test strip. Thus, at least one image of the time series of images of at least a part of the medical article may fully or partially comprise an image of at least one part color reference card and/or of the optical test strip having at least one reagent test field.

As outlined above, step ii) comprises deriving, from the time series of images, image-derived position information on a relative position of the mobile device and the medical article. The term "position information" as used herein is a broad term and is to be given its ordinary and customary meaning to a person of ordinary skill in the art and is not to be limited to a special or customized meaning. The term specifically may refer, without limitation, to at least one item of information describing at least one of a position and/or an orientation of at least one object. Specifically, the position information may describe the position and/or the orientation of the object qualitatively and/or quantitatively, such as in one or more absolute and/or relative coordinates. For example, the position information may be or may comprise a numerical item of information describing the position and/or the orientation of the object. The numerical item of information may be given by using one or more coordinates, such as for the degrees of freedom in space. As an example, spatial position information may be given by using a one-, two- or three-dimensional vector indicating the position of the object in an absolute or a relative coordinate system. For example, the coordinate system may be a Cartesian, a spherical and/or a cylindrical coordinate system. Other coordinate systems are also feasible. The coordinate system may be a body-fixed coordinate system and/or a "laboratory"-fixed coordinate system. The position information may describe the position and/or the orientation of an object in terms of absolute and/or relative values. The position of the object may be described by a position vector indicating the object's center of mass or another reference point of the object and/or by multiple position vectors indicating multiple reference points of the object, for example, the contour of the object. Additionally or alternatively, an angular orientation may be given, such as by using one, two or three angular values with respect to the same coordinate system or a different coordinate system. As an example, Euler angles may be used and/or nick, roll and gear angles. The orientation of the object may be described by one or more angles indicating a rotation of the object with respect to the coordinate system and/or with respect to another object, specifically by Euler angles, such as by proper Euler angles and/or by Tait-Bryan angles. Other options are feasible.

The term "image-derived" as used herein is a broad term and is to be given its ordinary and customary meaning to a person of ordinary skill in the art and is not to be limited to a special or customized meaning. The term specifically may refer, without limitation, to a property of at least one item, specifically of at least one item of information, of being generated by of one or more of retrieving, obtaining, calculating or deriving by other means from at least one image. Specifically, the term "image-derived position information" may, thus, refer to position information being generated by evaluating image data of at least one image. Specifically, an image-derived position information may be obtained by image analysis, by homography and/or by image processing. Thus, the image-derived position information may be obtained by an algorithm configured for analyzing and/or processing images, such as a computer vision algorithm. For example, the image-derived position information may be derived from one or more images of the time series of images captured in step i). Means for deriving position information of at least one object fully or partially visible in an image are generally known to the skilled person. Thus, as an example, one or more parameters derived from the image of the object may be used, such as at least one of the size of the object in the image, the orientation of the object in the image, an aspect ratio of two or more sides of the object in the image or the like. Additionally or alternatively, other optical image analysis techniques may be used, such as triangulation methods, specifically in case the mobile device comprises more than one camera.

The term "relative position" as used herein is a broad term and is to be given its ordinary and customary meaning to a person of ordinary skill in the art and is not to be limited to a special or customized meaning. The term specifically may refer, without limitation, to at least one item of position information indicating the position and/or orientation of at least one object with respect to at least one other object, such as in at least one coordinate system defined by the other object. Thus, the relative position may be or may comprise at least one spatial position such as at least one distance between the objects and/or at least one orientation of at least one object with respect to the at least one other object. Specifically, the relative position may describe a relative spatial position and/or orientation of the mobile device relative to the medical article or vice versa. The relative position may be obtained by comparing position information of the objects with each other, specifically by comparing the position information of the mobile device with the position information of the medical article. The position information may be obtained in different coordinate systems, and, thus, obtaining the relative position may comprise transforming position information from one coordinate system to another, specifically transforming position information into a common coordinate system. For the various options of the coordinate systems, reference may be made to the description given above. The relative position may be derived from the images of the time series of images, such as for each image, by using one or more of the techniques mentioned above and/or by other image evaluation techniques. For this application, it may be assumed that the position of the camera corresponds to the position of the mobile device. Since the relative position of the at least one camera may be derived from the image of the at least one part of the medical article, the relative position of the mobile device may be known. Specifically, the camera and the mobile device may be on the same plane. The camera of the mobile device may define the spatial position of the mobile device with respect to the medical article.

By performing step ii), as outlined above, a first time series of position information is generated. The term "first time series of position information" as used herein is a broad term and is to be given its ordinary and customary meaning to a person of ordinary skill in the art and is not to be limited to a special or customized meaning. The term specifically may refer, without limitation, to a sequence of position information being derived at different points in time, such as at least one item of position information derived from each of the images of the time series of images. The first time series of position information may specifically refer to a sequence of position information being obtained by deriving position information from image data. Thus, the points in time of the first time series of position information may correspond to the capturing times of the images of the time series of images captured in step i). The first time series of position information may comprise at least one item of image-derived position information for each capturing time. As further used herein, the term "first" is meant as a nomenclature and is not intended to refer to a ranking or to an order.

As outlined above, step iii) comprises using at least one sensor device for capturing measurement information on the relative position of the mobile device and the medical article. The term "sensor device" as used herein is a broad term and is to be given its ordinary and customary meaning to a person of ordinary skill in the art and is not to be limited to a special or customized meaning. The term specifically may refer, without limitation, to an arbitrary device which is configured for qualitatively or quantitatively determining at least one measurement information and further for generating at least one electronic signal being indicative of the measurement information. Specifically, the sensor device is comprised by the mobile device and, thus, may be configured for qualitatively or quantitatively determining the at least one measurement information of the mobile device, specifically relative to the medical article. The sensor device specifically may be or may comprise at least one position sensor device configured for sensing at least one item of position information, such as at least one item of information selected from the group consisting of: spatial position information; spatial velocity information; spatial acceleration information; angular position information; angular velocity information; angular acceleration information. For example, the sensor device may comprise one or more of an accelerometer; an orientation sensor; a gyroscopic sensor, specifically a 6-axis-gyroscopic sensor; a motion sensor. Thus, the sensor device may be configured for determining one or more of a motion, a velocity or an acceleration of the mobile device, specifically with a measurement frequency of more than 8 Hz, specifically more than 9 Hz or more specifically more than 10 Hz.

As further outlined above, the at least one sensor device is used for capturing measurement information on the relative position of the mobile device and the medical article. The term "measurement information" as used herein is a broad term and is to be given its ordinary and customary meaning to a person of ordinary skill in the art and is not to be limited to a special or customized meaning. The term specifically may refer, without limitation, to at least one item of information being determined by the at least one sensor device, specifically at least one item of position information such as outlined above. Specifically, as outlined above, the measurement information may comprise at least one item of information indicating at least one of: spatial position information of the mobile device; spatial velocity information of the mobile device; spatial acceleration information of the mobile device; angular position information of the mobile device; angular velocity information of the mobile device; angular acceleration information of the mobile device.

As outlined above, step iv) comprises deriving, from the measurement information, measurement-derived position information on the relative position of the mobile device and the medical article, thereby generating a second time series of position information. The term "measurement-derived" as used herein is a broad term and is to be given its ordinary and customary meaning to a person of ordinary skill in the art and is not to be limited to a special or customized meaning. The term specifically may refer, without limitation, to the property of an object or of at least one item of information of being derived by evaluating measurement information, specifically measurement information captured by the at least one sensor device. Thus, the at least one item of measurement-derived position information may be derived by one or more of retrieving, obtaining, estimating and/or calculating position information from the measurement information. Thus, as opposed to the image-derived position information which is derived from the images of the time series of images, the measurement-derived position information is derived, at least partially, by using the measurement information of the sensor device. Specifically, measurement-derived position information may be obtained by evaluating and/or analyzing at least one electronic signal generated by the sensor device, wherein the electronic signal may be indicative of the at least one measurement information. For example, measurement-derived position information may be or may comprise position information obtained by evaluating the generated signal from one or more sensor devices comprised by the mobile device, such as from one or more of the accelerometer, the orientation sensor, the gyroscopic sensor and/or the motion sensor of the mobile device.

The term "second time series of position information" as used herein is a broad term and is to be given its ordinary and customary meaning to a person of ordinary skill in the art and is not to be limited to a special or customized meaning. The term specifically may refer, without limitation, to a sequence of position information being generated at different points in time, specifically by making use of the measurement information of the sensor device. The second time series of position information may specifically refer to a sequence of position information being obtained by deriving position information from the measurement information of the sensor device captured in step iii), either alone or in combination with further information, such as information derived from the images captured in step i). Thus, the points in time of the second time series of position information may correspond to the points in time of the measurement information captured in step iii). The second time series of position information may comprise at least one item of measurement-derived position information, e.g., for each point in time of the measurement information captured in step iii). Again, in the context of the term "second time series of position information," the term "second" is given as nomenclature, without ranking or without indicating a sequence.

As outlined above, step v) comprises generating an augmented time series of position information. The term "augmented time series of position information" as used herein is a broad term and is to be given its ordinary and customary meaning to a person of ordinary skill in the art and is not to be limited to a special or customized meaning. The term specifically may refer, without limitation, to a mixed time series of position information. Specifically, the augmented timer series of position information may comprise at least two different time series of position information. For example, the augmented time series of position information comprises the first time series of position information and the second time series of position information. Adding further time series of position information may also be possible. Thus, the augmented time series of position information may comprise position information at different points in time, wherein the points in time may correspond to the points in time of the first and second time series of position information. In case, position information may be available from both the first and the second time series of position information at the same point in time, the augmented time series of position information may comprise position information from only one time series of position information, preferably from the first time series of position information.

As further outlined above, step vi) comprises providing guidance to a user in order to have the user bring the mobile device into at least one relative target position. The term "guidance" as used herein is a broad term and is to be given its ordinary and customary meaning to a person of ordinary skill in the art and is not to be limited to a special or customized meaning. The term specifically may refer, without limitation, to instructions provided by the mobile device to the user by one or more of visual, audible and/or haptic means. Specifically, the guidance may be provided to the user by prompting instructions on a display of the mobile device, such as verbal instructions and/or pictographic instructions, e.g., arrows indicating a direction into which the mobile device is to be moved and/or turned. Additionally or alternatively, the guidance may also be provided to the user by playing a sound and/or by playing spoken instructions, specifically via a loudspeaker of the mobile device. Another example may comprise guiding the user via a haptic feedback of the mobile device. Further, the user guidance may comprise a real-time user guidance. As used herein, without limitation, the term "real-time" specifically may refer to a situation where the mobile device may be configured for processing data in such a way that the processing results may be available within a predetermined period of time which is small in comparison with a typical reaction time of the user. Specifically, the real-time guidance of the user may comprise instructions brought to the user's attention with a time delay of less than 10 ms, more specifically with a time delay of less than 1 ms, after a movement of the mobile device on which the guidance may be based, wherein the time delay, as an example, may be calculated from a point in time at which a specific event happens in the real world, e.g., from a point in time at which the mobile device is in a specific position. The time delay may be limited by the measurement frequency of the sensor device and/or by a measurement speed of the camera. A time delay due to a delayed provision of the user guidance typically has to be minimized. The time delay of less than 10 ms may be sufficient for guiding a user in real time since the time delay may be smaller than the typical reaction time of the user.

The term "relative target position" as used herein is a broad term and is to be given its ordinary and customary meaning to a person of ordinary skill in the art and is not to be limited to a special or customized meaning. The term specifically may refer, without limitation, to at least one predetermined relative position of one object to another. Specifically, the relative target position may comprise a predetermined position information on the relative position of the mobile device to the medical article or vice versa. The relative target position may specifically comprise at least one predetermined distance and/or a predetermined angular orientation of the mobile device to the medical article. Therein, one or more target positions may be provided, including the option of one or more target ranges. The relative target position may be a favorable relative position of the mobile device to the medical article, such as predetermined by at least one empiric measurement and/or by theoretical analysis. Specifically, the relative target position may allow for capturing at least one image of the medical article in such a way that the captured image may be of sufficient quality to be used for the analytical measurement, specifically with regard to the intensity of the image. Further, the relative target position may be or may comprise a non-parallel orientation of the mobile device to the medical article. For example, the predetermined distance between the medical article and the mobile device may be in the range of 50 mm to 1 m, e.g., in the range of 70 mm to 200 mm, more specifically in the range of 80 mm to 150 mm. Further, the predetermined angular orientation may comprise an angle between the medical article and the mobile device. The angle, as an example, may be defined by at least one angle between a normal axis of the medical article, e.g., a normal axis perpendicular to a surface of the optical test strip and/or the color reference card, and an optical axis of the camera, wherein an angle of 0° may be defined as a parallel orientation. The target position may comprise an angle in the range of 0° to 90°, such as in the range of 15° to 45°, e.g., in the range of 20° to 40°. Other target positions may be possible, e.g., depending on the measurement conditions.

The method may further comprise performing step i) repeatedly, specifically continuously repeatedly. Specifically, step i) may be performed at a constant frame rate. As used herein, without limitation, the term "frame" specifically may refer to a single image from the time series of images. Thus, a frame rate may refer to a frequency of capturing single images of the time series of images. For example, step i) may be performed repeatedly at a frame rate of less than 10 frames per second, specifically at a frame rate of less than 5 frames per second, more specifically with a frame rate in the range of 1 to 2 frames per second.

The method may further comprise performing step iii) repeatedly, specifically continuously repeatedly. Further, step iii) may be performed at a constant measurement speed. For example, step iii) may be performed at a constant measurement speed of more than 8 Hz, specifically more than 9 Hz or more specifically more than 10 Hz.

Further, step vi) may comprise deriving at least one item of current position information from the augmented time series of position information and comparing the at least one item of current position information with the at least one relative target position. Step vi) may also comprise determining a current point in time, e.g., by using an internal clock of the mobile device and/or time information retrieved by the mobile device, e.g., via transmission from an external device, and wherein step vi) may further comprise determining whether the current point in time corresponds to a capturing time at which an image of the time series of images is captured, and, if so, using the first time series of position information for deriving the at least one item of current position information, and, if not, using the second time series of position information. Thus, whenever an image is captured, the image-derived position information derived from this image may be used, whereas, at points in time at which no image is captured, the measurement-derived position information derived for this specific point in time, e.g., extrapolated position information, may be used. Thus, step vi) may comprise providing the user guidance such that a difference between the at least one item of current position information and the at least one relative target position is decreased. As outlined above, step vi) may comprise providing real-time user guidance, specifically with a time delay of less than 10 ms, more specifically with a time delay of less than 1 ms.

As further outlined above, the relative position of the mobile device and the medical article may comprise at least one of: a distance between the mobile device and the medical article; an angular orientation between the mobile device and the medical article. The relative target position of the mobile device and the medical article may comprise at least one of: a predetermined distance between the mobile device and the medical article; a predetermined angular orientation between the mobile device and the medical article; a predetermined distance range between the mobile device and the medical article; a predetermined angular range of angular orientations between the mobile device and the medical article. Specifically, the relative target position of the mobile device and the medical article may comprise a non-parallel relative orientation of the mobile device and the medical article.

Further, the analytical measurement may comprise determining the concentration of at least one analyte in a sample of a body fluid. Thus, the medical article may comprise at least one optical test strip having at least one reagent test field. The method may further comprise determining the concentration of the at least one analyte in the sample of body fluid by automatically evaluating at least one color formation of the at least one reagent test field after reaction with the sample of the body fluid.

The medical article may further comprise at least one color reference card comprising at least one of: a plurality of different color reference fields having known reference color values; a plurality of different gray reference fields. The color reference card may further comprise at least one position marker, specifically at least one ArUco code label.

As outlined above, the mobile device comprises the at least one sensor device. The sensor device of the mobile device may comprise at least one sensor device selected from the group consisting of: an accelerometer; an orientation sensor; a gyroscopic sensor, specifically a 6-axis-gyroscopic sensor; a motion sensor.

Further, the first time series may comprise image-derived position information as a function of capturing times of the images. The second time series may comprise measurement-derived position information as a function of time. The measurement-derived position information of the second time series may be given for points in time differing from the capturing times of the images. The augmented time series may also comprise position information as a function of time. The position information of the augmented time series may be given for points in time being identical to the capturing times of the images and/or to the points in time of the second time series.

The method may further comprise in step iv) using at least one item of position information from the first time series of position information. Specifically, step iv) may comprise estimating the at least one item of measurement-derived position information on the basis of the at least one item of position information from the first time series of position information and the at least one item of measurement information captured in step iii). The estimating may comprise at least one of: interpolating position information based on image-derived position information derived in step ii) and measurement information captured in step iii); extrapolating position information based on image-derived position information derived in step ii) and measurement information captured in step iii); determining at least one prospective trajectory of the relative position of the mobile device and the medical article, based on the at least one item of position information from the first time series of position information and at least one item of measurement information captured in step iii). Thus, as an example, at a specific point in time, e.g., a specific capturing time, the relative position between the mobile device and the medical article may be derived from the respective image. Then, in case the current position shall be determined at a later point in time, in case no further image has been captured since the specific point in time of the last image, the relative position of the mobile device and the medical article may be determined by extrapolation, taking into account the last-known image-derived position information and further taking into account the measurement information of the at least one sensor device, e.g., information on a velocity, an acceleration or a tilt of the mobile device. Thereby, even though a low frame rate may be used for capturing the images, the augmentation by extrapolation may be used for generating current position information.

Further, the estimating may be performed for at least one point in time on the basis of at least one image-derived position information derived in step ii) for at least one capturing time of an image neighboring the point in time. The estimating may be performed for a plurality of times differing from capturing times of the images captured in step i).

Further, as outlined above, various algorithms may be used for deriving the image-derived position information from the time series of images in step ii). Thus, in step ii), the image-derived position information may be derived from the time series of images by using at least one target feature of the medical article in the respective image and by using at least one of the following:

a size of the target feature;
a position of the target feature;
an orientation of the target feature.

The target feature may comprise at least one of: an edge of the medical article visible in the respective image; a field of the medical article visible in the respective image, specifically at least one of a reagent test field, a color reference field, a gray reference field; a position marker of the medical article, specifically an ArUco code.

As outlined above, the method comprises in step vi) providing guidance to a user. The user guidance may specifically comprise at least one of: visual user guidance, specifically by displaying indications on a display of the mobile device; audible user guidance, specifically by giving audible user instructions via at least one loudspeaker of the mobile device; haptic user guidance, specifically by haptic feedback of the mobile device indicating the relative target position.

Further, the user guidance may comprise information for the user indicating at least one of: a direction into which the mobile device is to be moved in order to achieve the target position; an orientation into which the mobile device is to be oriented in order to achieve the target position.

The method may further comprise providing instructions to the user on an analytical measurement procedure. Specifically, the method may comprise prompting a user to bring the at least one medical article into a field of view of the camera. Additionally or alternatively, the method may further comprise providing to the user instructions for performing the analytical measurement, specifically at least one instruction selected from the group consisting of: bringing at least one optical test strip having at least one reagent test field, without having a sample of a body fluid applied thereto, into a field of view of the camera; bringing at least one optical test strip having at least one reagent test field, having a sample of a body fluid applied thereto, into a field of view of the camera; bringing at least one color reference card into a field of view of the camera.

In a further aspect of this disclosure, a mobile device is disclosed, the mobile device comprising at least one camera, the mobile device further comprising at least one sensor device for capturing position information, the mobile device being configured for performing the method according to this disclosure, such as according to any one of the embodiments disclosed above and/or according to any one of the embodiments disclosed in further detail below.

The mobile device may comprise at least one processor. The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math co-processor or a numeric co-processor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) or the like.

In a further aspect of this disclosure, a kit for performing at least one analytical measurement, specifically for determining the concentration of at least one analyte in at least one sample of a body fluid, is disclosed. The kit comprises the mobile device according to this disclosure, such as according to any one of the embodiments disclosed above and/or according to any one of the embodiments disclosed in further detail below, the kit further comprising at least one medical article.

The medical article may comprise the at least one optical test strip having the at least one reagent test field. Further, the kit may comprise the at least one color reference card, wherein the color reference card may comprise a plurality of different gray reference fields locally assigned to the test field, and wherein the color reference card may comprise a plurality of different color reference fields having known reference color values and a plurality of different gray reference fields locally assigned to the color reference fields.

In a further aspect of this disclosure, a computer program is disclosed. The computer program comprises instructions which, when executed by a mobile device having a camera, specifically by the mobile device according to this disclosure, such as according to any one of the embodiments disclosed above and/or according to any one of the embodiments disclosed in further detail below, cause the mobile device to carry out the method according to this disclosure, such as according to any one of the embodiments disclosed above and/or according to any one of the embodiments disclosed in further detail below.

In a further aspect of this disclosure, a computer-readable storage medium is disclosed, the computer-readable storage medium comprising instructions which, when executed by a mobile device having a camera, specifically by the mobile device according to this disclosure, such as according to any one of the embodiments disclosed above and/or according to any one of the embodiments disclosed in further detail below, cause the mobile device to carry out the method according to this disclosure, such as according to any one of the embodiments disclosed above and/or according to any one of the embodiments disclosed in further detail below.

As used herein, the term "computer-readable storage medium" specifically may refer to a non-transitory data storage means, such as a hardware storage medium having stored there-on computer-executable instructions. The computer-readable data carrier or storage medium specifically may be or may comprise a storage medium such as a random-access memory (RAM) and/or a read-only memory (ROM).

The computer program may also be embodied as a computer program product. As used herein, a computer program product may refer to the program as a tradable product. The product may generally exist in an arbitrary format, such as in a paper format, or on a computer-readable data carrier and/or on a computer-readable storage medium. Specifically, the computer program product may be distributed over a data network.

The methods and devices according to this disclosure provide a large number of ad-vantages over similar methods and devices known in the art. Specifically, the method and devices according to this disclosure may allow a fast and efficient way for performing the analytical measurement since the additional use of the sensor device comprised by the mobile device may save computing resources of the mobile device. Thus, using the sensor device of the mobile device for tracking the user movement after capturing an image and/or in between the capturing of two subsequent images of the time series of images may enable the use of a greater variety of mobile device. Further, the method may provide a much more convenient and efficient user handling when capturing images of the medical article.

Furthermore, the method may comprise using the sensor device of the mobile device, such as the accelerometer, for example, the 6-axis gyroscope, for tracking the user movement after an image recording and/or processing. The measurement-derived position information obtained from the measurement information may be available at much higher frequencies, for example, at frequencies of above 10 Hz even for mobile devices with low computing resources. Thus, based on the extrapolated spatial and/or angular position information the guidance of the user may be continued to capture one or more images being of sufficient quality to perform at least one analytical measurement.

Summarizing and without excluding further possible embodiments, the following embodiments may be envisaged:

Embodiment 1: A method of performing at least one analytical measurement by using a mobile device having at least one camera, the method comprising:

i) capturing, by using the camera, a time series of images of at least a part of at least one medical article;

ii) deriving, from the time series of images, image-derived position information on a relative position of the mobile device and the medical article, thereby generating a first time series of position information;

iii) capturing, by using at least one sensor device of the mobile device, measurement information on the relative position of the mobile device and the medical article;

iv) deriving, from the measurement information, measurement-derived position information on the relative position of the mobile device and the medical article, thereby generating a second time series of position information;

v) generating an augmented time series of position information by combining the first time series of position information and the second time series of position information; and vi) providing guidance to a user, based on the augmented time series of position information, for changing the relative position of the mobile device and the medical article in order to have the user bring the mobile device into at least one relative target position of the mobile device and the medical article.

Embodiment 2: The method according to the preceding embodiment, wherein step i) is performed repeatedly, specifically continuously repeatedly.

Embodiment 3: The method according to the preceding embodiment, wherein step i) is performed at a constant frame rate.

Embodiment 4: The method according to any one of the two preceding embodiments, wherein step i) is performed repeatedly at a frame rate of less than 10 frames per second, specifically of less than five frames per second.

Embodiment 5: The method according to any one of the preceding embodiments, wherein step iii) is performed repeatedly, specifically continuously repeatedly.

Embodiment 6: The method according to any one of the preceding embodiments, wherein step vi) comprises deriving at least one item of current position information from the augmented time series of position information and comparing the at least one item of current position information with the at least one relative target position.

Embodiment 7: The method according to the preceding embodiment, wherein step vi) comprises determining a current point in time, and wherein step vi) further comprises determining whether the current point in time corresponds to a capturing time at which an image of the time series of images is captured, and, if so, using the first time series of position information for deriving the at least one item of current position information, and, if not, using the second time series of position information.

Embodiment 8: The method according to any one of the two preceding embodiments, wherein step vi) comprises providing the user guidance such that a difference between the at least one item of current position information and the at least one relative target position is decreased.

Embodiment 9: The method according to any one of the preceding embodiments, wherein step vi) comprises providing real-time user guidance, specifically with a time delay of less than 10 ms, more specifically with a time delay of less than 1 ms.

Embodiment 10: The method according to any one of the preceding embodiments, wherein the relative position of the mobile device and the medical article comprises at least one of: a distance between the mobile device and the medical article; an angular orientation between the mobile device and the medical article.

Embodiment 11: The method according to any one of the preceding embodiments, wherein the relative target position of the mobile device and the medical article comprises at least one of: a predetermined distance between the mobile device and the medical article; a predetermined angular orientation between the mobile device and the medical article; a predetermined distance range between the mobile device and the medical article; a predetermined angular range of angular orientations between the mobile device and the medical article.

Embodiment 12: The method according to any one of the preceding embodiments, wherein the relative target position of the mobile device and the medical article comprises a non-parallel relative orientation of the mobile device and the medical article.

Embodiment 13: The method according to any one of the preceding embodiments, wherein the analytical measurement comprises determining the concentration of at least one analyte in a sample of a body fluid.

Embodiment 14: The method according to the preceding embodiment, wherein the medical article comprises at least one optical test strip having at least one reagent test field.

Embodiment 15: The method according to the preceding embodiment, wherein the method further comprises determining the concentration of the at least one analyte in the sample of body fluid by automatically evaluating at least one coloration color formation of the at least one reagent test field after reaction with the sample of the body fluid.

Embodiment 16: The method according to any one of the three preceding embodiments, wherein the medical article further comprises at least one color reference card comprising at least one of: a plurality of different color reference fields having known reference color values; a plurality of different gray reference fields.

Embodiment 17: The method according to the preceding embodiment, wherein the color reference card further comprises at least one position marker, specifically at least one ArUco code label.

Embodiment 18: The method according to any one of the preceding embodiments, wherein the sensor device of the mobile device comprises at least one sensor device selected from the group consisting of: an accelerometer; an orientation sensor; a gyroscopic sensor, specifically a 6-axis-gyroscopic sensor; a motion sensor.

Embodiment 19: The method according to any one of the preceding embodiments, wherein the first time series comprises image-derived position information as a function of capturing times of the images.

Embodiment 20: The method according to the preceding embodiment, wherein the second time series comprises measurement-derived position information as a function of time.

Embodiment 21: The method according to the preceding embodiment, wherein the measurement-derived position information of the second time series is given for points in time differing from the capturing times of the images.

Embodiment 22: The method according to any one of the preceding embodiments, wherein step iv) further comprises using at least one item of position information from the first time series of position information.

Embodiment 23: The method according to the preceding embodiment, wherein step iv) comprises estimating at least one item of measurement-derived position information on the basis of the at least one item of position information from the first time series of position information and at least one item of measurement information captured in step iii).

Embodiment 24: The method according to the preceding embodiment, wherein the estimating comprises at least one of: interpolating position information based on image-derived position information derived in step ii) and measurement information captured in step iii); extrapolating position information based on image-derived position information derived in step ii) and measurement information captured in step iii); determining at least one prospective trajectory of the relative position of the mobile device and the medical article, based on the at least one item of position information from the first time series of position information and at least one item of measurement information captured in step iii).

Embodiment 25: The method according to the preceding embodiment, wherein the estimating is performed for at least one point in time on the basis of at least one image-derived position information derived in step ii) for at least one capturing time of an image neighboring the point in time.

Embodiment 26: The method according to any one of the three preceding embodiments, wherein the estimating is performed for a plurality of times differing from capturing times of the images captured in step i).

Embodiment 27: The method according to any one of the preceding embodiments, wherein, in step ii), the image-derived position information is derived from the time series of images by using at least one target feature of the medical article in the respective image and by using at least one of the following:
  a size of the target feature;
  a position of the target feature;
  an orientation of the target feature.

Embodiment 28: The method according to the preceding embodiment, wherein the target feature comprises at least one of: an edge of the medical article visible in the respective image; a field of the medical article visible in the respective image, specifically at least one of a reagent test field, a color reference field, a gray reference field; a position marker of the medical article, specifically an ArUco code.

Embodiment 29: The method according to any one of the preceding embodiments, wherein the user guidance comprises at least one of: visual user guidance, specifically by displaying indications on a display of the mobile device; audible user guidance, specifically by giving audible user instructions via at least one loudspeaker of the mobile device; haptic user guidance, specifically by haptic feedback of the mobile device indicating the relative target position.

Embodiment 30: The method according to any one of the preceding embodiments, wherein the user guidance comprises information for the user indicating at least one of: a direction into which the mobile device is to be moved in order to achieve the target position; an orientation into which the mobile device is to be oriented in order to achieve the target position.

Embodiment 31: The method according to any one of the preceding embodiments, wherein the method further comprises prompting a user to bring the at least one medical article into a field of view of the camera.

Embodiment 32: The method according to any one of the preceding embodiments, wherein the method further comprises providing to the user instructions for performing the analytical measurement, specifically at least one instruction selected from the group consisting of: bringing at least one optical test strip having at least one reagent test field, without having a sample of a body fluid applied thereto, into a field of view of the camera; bringing at least one optical test strip having at least one reagent test field, having a sample of a body fluid applied thereto, into a field of view of the camera; bringing at least one color reference card into a field of view of the camera.

Embodiment 33: A mobile device, the mobile device comprising at least one camera, the mobile device further comprising at least one sensor device for capturing position information, the mobile device being configured for performing the method according to any one of the preceding embodiments.

Embodiment 34: The mobile device according to the preceding embodiment, wherein the mobile device comprises at least one processor.

Embodiment 35: A kit for performing at least one analytical measurement, specifically for determining the concentration of at least one analyte in at least one sample of a body fluid, the kit comprising the mobile device according to any one of the preceding embodiments referring to a mobile device, the kit further comprising at least one medical article.

Embodiment 36: The kit according to the preceding embodiment, wherein the medical article comprises at least one optical test strip having at least one reagent test field.

Embodiment 37: The kit according to the preceding embodiment, further comprising at least one color reference card, wherein the color reference card comprises a plurality of different gray reference fields locally assigned to the test field, and wherein the color reference card comprises a plurality of different color reference fields having known reference color values and a plurality of different gray reference fields locally assigned to the color reference fields.

Embodiment 38: A computer program comprising instructions which, when executed by a mobile device having a camera, specifically by the mobile device according to any one of the preceding embodiments referring to a mobile device, cause the mobile device to carry out the method according to any one of the preceding embodiments referring to a method.

Embodiment 39: A computer-readable storage medium comprising instructions which, when executed by a mobile device having a camera, specifically by the mobile device according to any one of the preceding embodiments referring to a mobile device, cause the mobile device to carry out the method according to any one of the preceding embodiments referring to a method.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
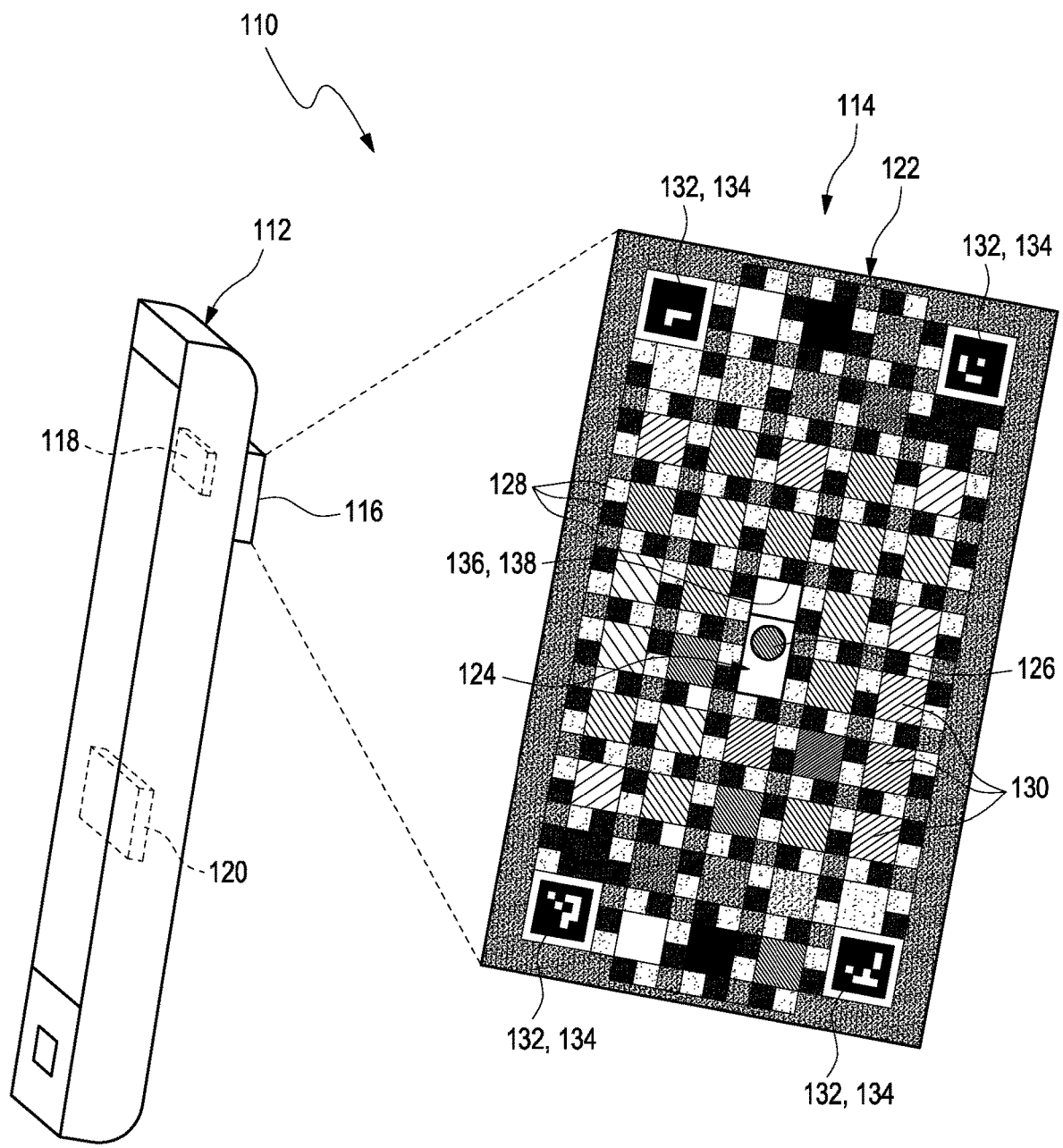
FIG. 1 shows an embodiment of a kit and a mobile device for performing at least one analytical measurement.

In FIG. 1, an exemplary embodiment of a kit 110 for performing at least one analytical measurement is shown in a perspective view. The kit 110 comprises a mobile device 112 and at least one medical article 114. Specifically, the kit 110 may be configured for determining the concentration of at least one analyte in at least one sample of a body fluid.

Figure 2:
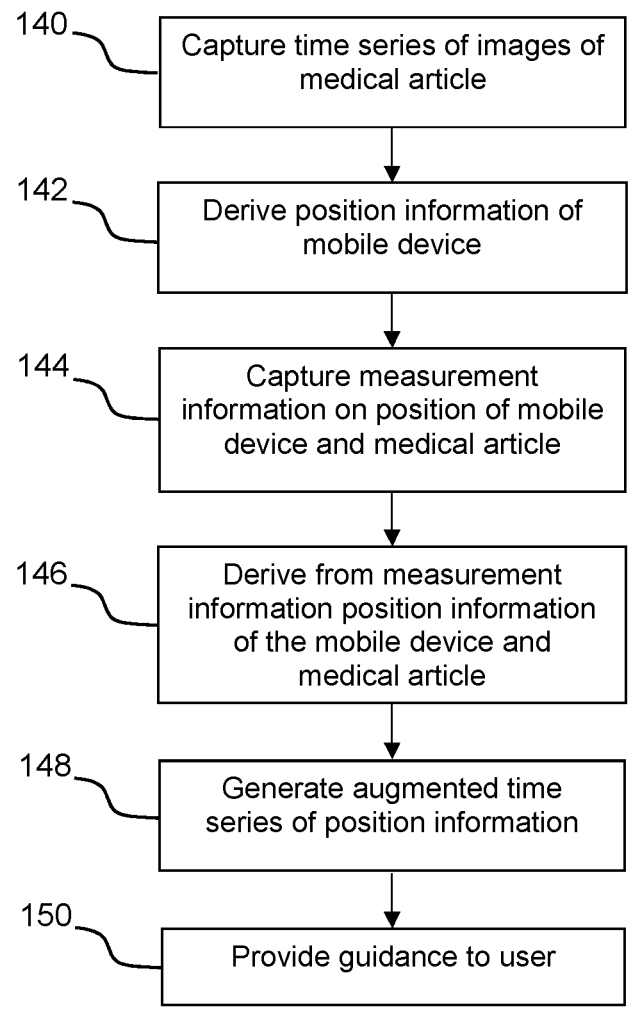
FIG. 2 shows a flow chart of an embodiment of a method of performing at least one analytical measurement by using a mobile device.

The mobile device 112 comprises at least one camera 116 and at least one sensor device 118 for capturing position information. Thus, the mobile device 112 is configured for performing the method of performing at least one analytical measurement. The method is shown in FIG. 2 and will be explained in further detail below. Thus, reference may be made to the description of FIG. 2.

The mobile device 112 may further comprise at least one processor 120. Specifically, the processor 120 may be configured, such as by software programming, for performing and/or supporting one or more of the method steps i) to vi) of the method. Thus, the method specifically may be computer-implemented or computer-controlled.

Further, the medical article 114 may comprise at least one color reference card 122 and/or at least one optical test strip 124 having at least one reagent test field 126. As can be seen in FIG. 1, the medical article 114 may also comprise both the color reference card 122 and the optical test strip 124, such as an integral part and/or as an overlay of two articles stacked on top of each other or being positioned in a predetermined fashion relative to one another.

The color reference card 122 may comprise a plurality of different gray reference fields 128 and/or a plurality of different color reference fields 130 having known reference color values. The different gray reference fields 128 may be locally assigned to the reagent test field 126 and/or to the color reference fields 130. The color reference card 122 may further comprise at least one position marker 132. The position marker 132 may be or may comprise at least one ArUco code label 134. Other position markers, however, are also feasible.

Further, the color reference card 122 may comprise at least one positioning element 136. The positioning element 136 may be or may comprise a window element 138. The positioning element 136 may be configured for positioning the optical test strip 124 and/or the reagent test field 126 with respect to the color reference card 122 and for keeping the optical test strip 124 and/or the reagent test field 126 in a fixed position. For example, the optical test strip 124 and/or the reagent test field 126 may be visible through the window element 138 when the optical test strip 124 and/or the reagent test field 126 is placed behind the color reference card 122.

In FIG. 2, a flow chart of an exemplary embodiment of a method of performing at least one analytical measurement is shown. The method comprises using the mobile device 112 having at least one camera 116. Further, the method comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method may comprise additional method steps that are not listed.

The method comprises:

i) (denoted by reference number 140) capturing, by using the camera 116, a time series of images of at least a part of the at least one medical article 114;

ii) (denoted by reference number 142) deriving, from the time series of images, image-derived position information on a relative position of the mobile device 112 and the medical article 114, thereby generating a first time series of position information;

iii) (denoted by reference number 144) capturing, by using the at least one sensor device 118 of the mobile device 112, measurement information on the relative position of the mobile device 112 and the medical article 114;

iv) (denoted by reference number 146) deriving, from the measurement information, measurement-derived position information on the relative position of the mobile device 112 and the medical article 114, thereby generating a second time series of position information;

v) (denoted by reference number 148) generating an augmented time series of position information by combining the first time series of position information and the second time series of position information; and vi) (denoted by reference number 150) providing guidance to a user, based on the augmented time series of position information, for changing the relative position of the mobile device 112 and the medical article 114 in order to have the user bring the mobile device 112 into at least one relative target position of the mobile device 112 and the medical article 114.

The method may specifically comprise performing step i) repeatedly, more specifically continuously repeatedly. Further, in step ii), the image-derived position information may be derived from the time series of images by using at least one target feature of the medical article 114 in the respective image. For example, one or more of a size, a position and/or an orientation of the target feature may be used to derive the image-derived position information. Further, the target feature may be or may comprise one or more of an edge of the medical article 114, a field of the medical article 114, such as the reagent test field 126, a color reference field 130 or a gray reference field 128, or the position marker 132 of the medical article 114.

Figure 3:
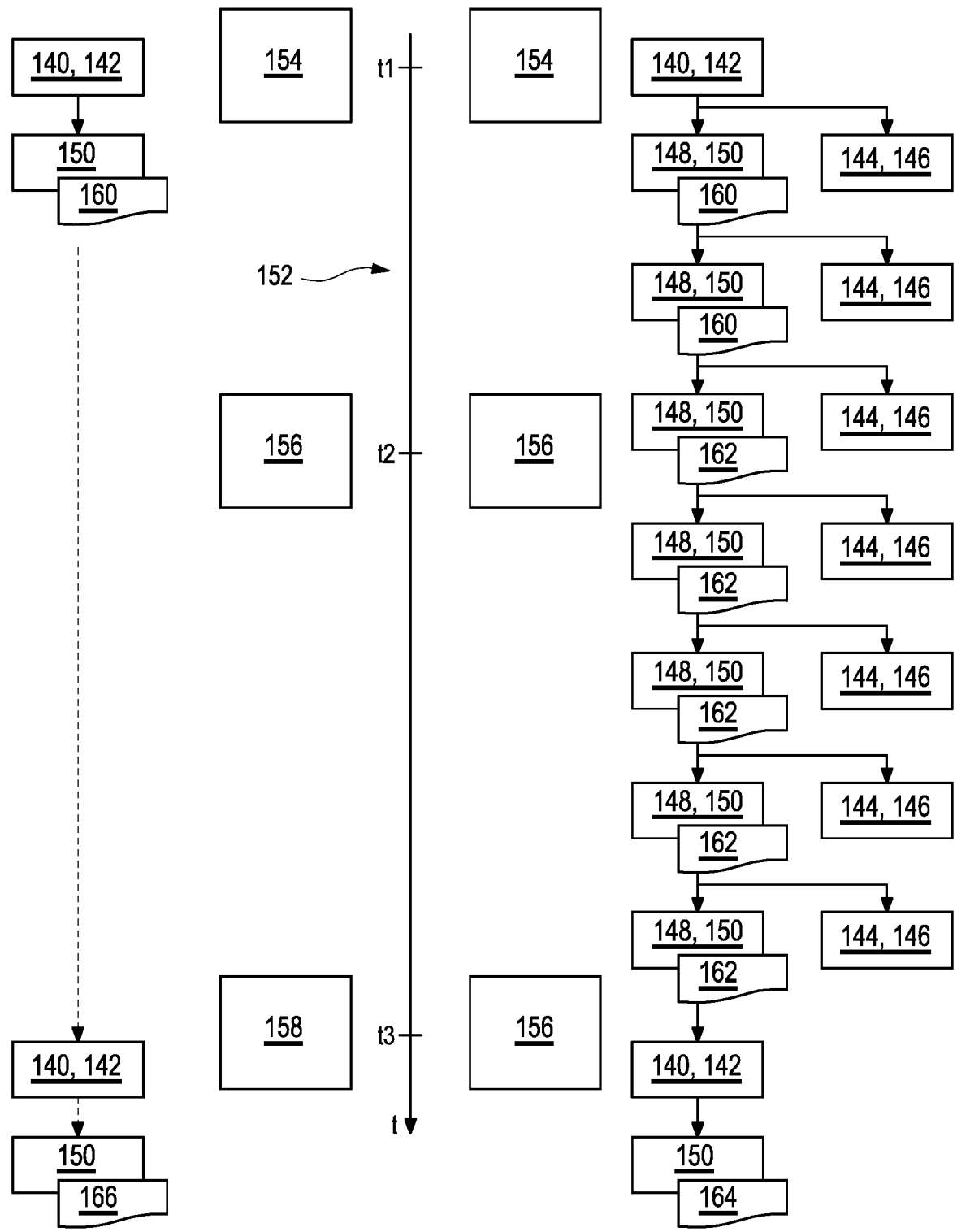
FIG. 3 shows a flow chart of another embodiment of a method of performing at least one analytical measurement of a mobile device.

Alternatively or additionally, step iii) may be performed repeatedly, specifically continuously repeatedly. Another exemplary embodiment of the method wherein the method steps may be repeated continuously is shown in FIG. 3 and will be explained further detailed below. Thus, reference may be made to the description of FIG. 3.

Further, step iv) may comprise using at least one item of position information from the first time series of position information. Specifically, step iv) may comprise estimating the measurement-derived position information on the basis of the at least one item of position information from the first time series of position information and at least one item of measurement information captured in step iii). For example, the measured derived position information may be estimated by interpolating position information based on image-derived position information derived in step ii) and measurement information captured in step iii). Further, the measured derived position information may also be estimated by extrapolating position information based on image-derived position information derived in step ii) and measurement information captured in step iii). The estimating of the measurement-derived position information may further comprise determining at least one prospective trajectory of the relative position of the mobile device 112 and the medical article 114, based on the at least one item of position information from the first time series of position information and at least one item of measurement information captured in step iii).

Thus, the first time series of position information and the second time series of position information may comprise position information as a function of time. As outlined above, the augmented time series generated in step v) is generated by combining the first time series of position information and the second time series of position information. Thus, the augmented time series of position information may also comprise position information as a function of time. The augmented time series of position information may comprise position information of the first time series of position information and additionally position information of the second time series of position information, specifically for the points in time where no image-derived position information from the first time series of position information is available.

Further, step vi) may comprise deriving at least one item of current position information from the augmented time series of position information. Thus, it may be possible to compare the at least one item of current position information with the relative target position. The current item of position information may be derived from the first time series of position information if a current point in time, at which the current position information is to be determined, corresponds to a capturing time at which an image of the time series of images is captured. In case the current point in time does not correspond to a capturing time of the time series of images, the current position information may be derived from the second time series of position information. Thus, the user guidance may be provided such that a difference between the at least one item of current position information and the at least one relative target position is decreased.

FIG. 3 shows a flow chart of another exemplary embodiment of the method of performing at least one analytical measurement. The embodiment of FIG. 3 may form a more detailed variation of the embodiment shown in FIG. 2, so for most terms and options reference may be made to FIG. 2. In FIG. 3, a timeline 152 is shown together with a flow chart of the method. On the right hand side of the timeline 152, an exemplary embodiment of the method according to this disclosure, such as, for example, according to the exemplary embodiment of FIG. 2, is shown. Contrarily and for reasons of comparison, only, a method of performing an analytical method without using measurement-derived position information is shown on the left hand side of the timeline 152. Thus, the part on the right hand side of the timeline 152 constitutes an embodiment referring to this disclosure, whereas the steps on the left hand side of the timeline 152 are given for the purpose of comparison. The method steps of the method on the right hand side may correspond to the method steps of FIG. 2. Thus, reference may be made to the description of FIG. 2.

At a point in time t1, the mobile device 112 may be in a relative position too far away from the medical article 114 (denoted by reference number 154). Thus, when initially performing step i) and ii) of the method, the user may be guided, based on the image-derived position information, to decrease the distance (denoted by reference number 160) between the mobile device 112 and the medical article 114. In parallel to the user movement, specifically steps iii) and iv) may be performed, wherein measurement information of the sensor device 118 of the mobile device 112 may be used to track the user movement. The current position of the mobile device 112 may be obtained by extrapolating the movement of the mobile device 112 based on the image-derived position information and the measurement information captured in step iii). Thus, steps v) and vi) may be performed, wherein the user guidance may specifically comprise a real-time user guidance.

As can be seen in FIG. 3, method steps iii), iv), v) and vi) may be performed repeatedly. Specifically, method steps iii) and iv) may be performed at a constant measurement speed of above 8 Hz. However, method steps i) and ii) may be performed at a constant frame rate, specifically at a frame rate of less than 10 frames per second, more specifically of less than five frames per second. Thus, when the mobile device 112 may be in the relative target position to the medical article 114 at a point in time t2, the user may be guided to hold the mobile device 112 in the current position (denoted by reference number 162).

At a point in time t3, when the mobile device 112 may be registered to be in the relative target position 156, a further image of at least part of the medical article 114 may be captured based on which the analytical measurement may be performed. After the analytical measurement was performed, the user may be informed that the image capturing and/or the analytical measurement is done (denoted by reference number 164).

Contrarily, when the sensor device 118 may not be used to track the movement of the mobile device 112, position information at the point in time t2 may not be available since the mobile device 112 may not be able to process images within the time period between t1 and t3. Thus, the mobile device 112 may be in a position to close to the medical article 114 at the point in time t3 (denoted by reference number 158). In this case, the user may be guided to increase the distance of the mobile device 112 to the medical article 114 (denoted by reference number 166). Thus, the user may be trapped in a loop of searching the correct relative target position.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

110 Kit
112 mobile device
114 medical article
116 Camera
118 sensor device (sensor)
120 Processor
122 color reference card
124 optical test strip
126 reagent test field
128 gray reference field
130 color reference field
132 position marker
134 ArUco code label
136 positioning element
138 window element
140 capturing a time series
142 deriving image-based position information
144 capturing measurement information
146 deriving measured-based position information
148 generating an augmented time series of position information
150 providing guidance to a user
152 Timeline
154 mobile device too far away
156 mobile device and medical article in relative target position
158 mobile device too close
160 user guidance: decrease distance
162 user guidance: hold still
164 user guidance. analytical measurement done
166 user guidance: increase distance

What is claimed is:

1. A method of performing an analytical measurement using a mobile device having a camera, the method comprising:
   i) using the camera to capture a time series of images of at least a part of a medical article;
   ii) deriving, from the time series of images, image-derived position information on a relative position of the mobile device and the medical article, thereby generating a first time series of position information;
   iii) using a sensor of the mobile device to capture measurement information on the relative position of the mobile device and the medical article;
   iv) deriving, from the measurement information alone or in combination with the image-derived position information, measurement-derived position information on the relative position of the mobile device and/or the medical article, thereby generating a second time series of position information;
   v) generating an augmented time series of position information by combining the first time series of position information and the second time series of position information; and
   vi) providing guidance to a user, based on the augmented time series of position information, for changing the relative position of the mobile device and the medical article in order to have the user bring the mobile device into a relative target position of the mobile device and the medical article.

2. The method according to claim 1, wherein step vi) comprises deriving an item of current position information from the augmented time series of position information and comparing the item of current position information with the relative target position.

3. The method according to claim 2, wherein step vi) comprises determining a current point in time and determining whether the current point in time corresponds to a capturing time at which an image of the time series of images is captured, and, if so, using the first time series of position information for deriving the item of current position information, and, if not, using the second time series of position information.

4. The method according to claim 1, wherein the relative target position of the mobile device and the medical article comprises a non-parallel relative orientation of the mobile device and the medical article.

5. The method according to claim 1, wherein the analytical measurement comprises determining the concentration of an analyte in a sample of a body fluid, wherein the medical article comprises an optical test strip having a reagent test field.

6. The method according to claim 5, wherein the medical article further comprises a color reference card comprising at least one of (i) a plurality of different color reference fields having known reference color values and (ii) a plurality of different gray reference fields.

7. The method according to claim 1, wherein the first time series comprises image-derived position information as a function of capturing times of the images, wherein the second time series comprises measurement-derived position information as a function of time, wherein the measurement-derived position information of the second time series is given for points in time differing from the capturing times of the images.

8. The method according to claim 1, wherein step iv) further comprises using an item of position information from the first time series of position information and estimating an item of measurement-derived position information on the basis of the item of position information from the first time series of position information and at least one item of measurement information captured in step iii).

9. The method according to claim 8, wherein the estimating comprises at least one of:
  interpolating position information based on image-derived position information derived in step ii) and measurement information captured in step iii);
  extrapolating position information based on image-derived position information derived in step ii) and measurement information captured in step iii);
  determining a prospective trajectory of the relative position of the mobile device and the medical article based on the item of position information from the first time series of position information and at least one item of measurement information captured in step iii).

10. The method according to claim 1, wherein the user guidance comprises information for the user indicating at least one of (i) a direction into which the mobile device is to be moved in order to achieve the target position, and (ii) an orientation into which the mobile device is to be oriented in order to achieve the target position.

11. A mobile device, comprising:
  a camera; and
  a sensor configured for capturing position information;
  wherein the mobile device is configured for performing the method according to claim 1.

12. A kit for determining the concentration of an analyte in a body fluid sample, the kit comprising:
  the mobile device according to claim 11; and
  the medical article comprising an optical test strip having a reagent test field.

13. The kit according to claim 12, further comprising a color reference card that comprises a plurality of different gray reference fields locally assigned to the test field, wherein the color reference card further comprises a plurality of different color reference fields having known reference color values and a plurality of different gray reference fields locally assigned to the color reference fields.

14. A non-transitory computer readable medium having stored thereon computer-executable instructions for performing the method of claim 1.

* * * * *